(12) United States Patent
Yeung et al.

(10) Patent No.: US 10,599,212 B2
(45) Date of Patent: Mar. 24, 2020

(54) NAVIGATION OF A VIRTUAL PLANE USING A ZONE OF RESTRICTION FOR CANCELING NOISE

(71) Applicant: MICROSOFT TECHNOLOGY LICENSING, LLC, Redmond, WA (US)

(72) Inventors: Brian Y. Yeung, Seattle, WA (US); Anton Andrews, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 198 days.

(21) Appl. No.: 15/499,761

(22) Filed: Apr. 27, 2017

(65) Prior Publication Data

US 2017/0285783 A1 Oct. 5, 2017

Related U.S. Application Data

(63) Continuation of application No. 12/363,094, filed on Jan. 30, 2009, now Pat. No. 9,625,030.

(51) Int. Cl.
| | | |
|---|---|---|
| *G06F 3/01* | (2006.01) | |
| *G06K 9/00* | (2006.01) | |
| *G06F 3/0346* | (2013.01) | |
| *A63F 13/213* | (2014.01) | |
| *G06T 19/00* | (2011.01) | |
| *G10L 15/22* | (2006.01) | |
| *G10K 11/16* | (2006.01) | |
| *G06F 17/00* | (2019.01) | |

(52) U.S. Cl.
CPC ............ *G06F 3/011* (2013.01); *A63F 13/213* (2014.09); *G06F 3/017* (2013.01); *G06F 3/0346* (2013.01);
(Continued)

(58) Field of Classification Search
CPC ........ G06F 3/011; G06F 3/017; G06F 3/0346; G06F 3/0483; A63F 13/213; G10L 15/22
See application file for complete search history.

(56) References Cited

U.S. PATENT DOCUMENTS

| | | |
|---|---|---|
| 4,843,568 A | 6/1989 | Krueger et al. |
| 5,563,988 A | 10/1996 | Maes et al. |
| | (Continued) | |

FOREIGN PATENT DOCUMENTS

| | | |
|---|---|---|
| CN | 101254344 B | 6/2010 |
| EP | 0583061 A2 | 2/1994 |
| | (Continued) | |

OTHER PUBLICATIONS

"Adding Virtual Objects with Hand Gestures in Real-Time", Retrieved from <<http://video.google.com>>, Mar. 22, 2007, 2 Pages.
(Continued)

*Primary Examiner* — Quoc A Tran
(74) *Attorney, Agent, or Firm* — Alleman Hall Creasman & Tuttle LLP

(57) ABSTRACT

A touchless human computer interface (HCI) provides a virtual surface in three-dimensional space and a zone of restriction for defining a level of sensitivity to movements in order to cancel noise that may be caused by natural wobble of a human appendage. The touchless HCI may receive input regarding a user movement, process the input to generate clean gesture data and analyze at least one dynamic variable to determine an interpreted action based upon a relationship of the clean gesture data with respect to the virtual surface.

19 Claims, 17 Drawing Sheets

(52) U.S. Cl.
CPC ..... *G06K 9/00335* (2013.01); *G06K 9/00342* (2013.01); *G06K 9/00355* (2013.01); *G06K 9/00362* (2013.01); *G06K 9/00369* (2013.01); *G06T 19/006* (2013.01); *G10K 11/16* (2013.01); *G10L 15/22* (2013.01)

(56) References Cited

U.S. PATENT DOCUMENTS

| | | | |
|---|---|---|---|
| 5,875,108 | A | 2/1999 | Hoffberg et al. |
| 5,913,727 | A | 6/1999 | Ahdoot |
| 6,057,909 | A | 5/2000 | Yahav et al. |
| 6,100,517 | A | 8/2000 | Yahav et al. |
| 6,141,463 | A | 10/2000 | Covell et al. |
| 6,167,433 | A | 12/2000 | Maples et al. |
| 6,181,343 | B1 | 1/2001 | Lyons |
| 6,222,465 | B1 | 4/2001 | Kumar et al. |
| 6,256,033 | B1 | 7/2001 | Nguyen |
| 6,308,565 | B1 | 10/2001 | French et al. |
| 6,414,672 | B2 | 7/2002 | Rekimoto et al. |
| 6,430,997 | B1 | 8/2002 | French et al. |
| 6,498,628 | B2 | 12/2002 | Iwamura |
| 6,502,515 | B2 | 1/2003 | Burckhardt et al. |
| 6,512,838 | B1 | 1/2003 | Ratii et al. |
| 6,539,931 | B2 | 4/2003 | Trajkovic et al. |
| 6,554,433 | B1 | 4/2003 | Holler |
| 6,674,877 | B1 | 1/2004 | Jojic et al. |
| 6,677,969 | B1 | 1/2004 | Hongo |
| 6,720,949 | B1 | 4/2004 | Pryor et al. |
| 6,749,432 | B2 | 6/2004 | French et al. |
| 6,765,726 | B2 | 7/2004 | French et al. |
| 6,771,277 | B2 | 8/2004 | Ohba |
| 6,876,496 | B2 | 4/2005 | French et al. |
| 6,890,262 | B2 | 5/2005 | Dishi et al. |
| 6,950,534 | B2 | 9/2005 | Cohen et al. |
| 7,006,236 | B2 | 2/2006 | Tomasi et al. |
| 7,036,094 | B1 | 4/2006 | Cohen et al. |
| 7,042,440 | B2 | 5/2006 | Pryor et al. |
| 7,050,177 | B2 | 5/2006 | Tomasi et al. |
| 7,058,204 | B2 | 6/2006 | Hildreth et al. |
| 7,151,530 | B2 | 12/2006 | Roeber et al. |
| 7,224,384 | B1 | 5/2007 | Iddan et al. |
| 7,227,526 | B2 | 6/2007 | Hildreth et al. |
| 7,233,316 | B2 | 6/2007 | Smith et al. |
| 7,259,747 | B2 | 8/2007 | Bell |
| 7,293,356 | B2 | 11/2007 | Sohn et al. |
| 7,308,112 | B2 | 12/2007 | Fujimura et al. |
| 7,310,431 | B2 | 12/2007 | Gokturk et al. |
| 7,317,836 | B2 | 1/2008 | Fujimura et al. |
| 7,340,077 | B2 | 3/2008 | Gokturk et al. |
| 7,348,963 | B2 | 3/2008 | Bell |
| 7,359,121 | B2 | 4/2008 | French et al. |
| 7,367,887 | B2 | 5/2008 | Watabe et al. |
| 7,379,563 | B2 | 5/2008 | Shamaie |
| 7,452,275 | B2 | 11/2008 | Kuraishi |
| 7,590,262 | B2 | 9/2009 | Fujimura et al. |
| 7,598,942 | B2 | 10/2009 | Underkoffler et al. |
| 7,646,372 | B2 | 1/2010 | Marks et al. |
| 7,701,439 | B2 | 4/2010 | Hillis et al. |
| 7,755,608 | B2 | 7/2010 | Chang et al. |
| 7,791,808 | B2 | 9/2010 | French et al. |
| 7,854,655 | B2 | 12/2010 | Mao et al. |
| 7,874,917 | B2 | 1/2011 | Marks et al. |
| 7,898,522 | B2 | 3/2011 | Hildreth et al. |
| 8,738,701 | B2 | 5/2014 | Padmanaban et al. |
| 2001/0002126 | A1 | 5/2001 | Rosenberg et al. |
| 2001/0040572 | A1 | 11/2001 | Bradski et al. |
| 2002/0036617 | A1 | 3/2002 | Pryor |
| 2003/0017872 | A1 | 1/2003 | Oishi et al. |
| 2004/0207597 | A1 | 10/2004 | Marks |
| 2004/0215689 | A1 | 10/2004 | Dooley et al. |
| 2005/0059488 | A1 | 3/2005 | Larsen et al. |
| 2005/0088409 | A1 | 4/2005 | Van Berkel |
| 2005/0166163 | A1 | 7/2005 | Chang et al. |
| 2005/0238201 | A1 | 10/2005 | Shamaie |
| 2006/0010400 | A1 | 1/2006 | Dehlin et al. |
| 2006/0094503 | A1 | 5/2006 | Ajioka et al. |
| 2006/0139314 | A1* | 6/2006 | Bell .......... A63F 13/02 345/156 |
| 2006/0187196 | A1 | 8/2006 | Underkoffler et al. |
| 2006/0188144 | A1 | 8/2006 | Sasaki et al. |
| 2006/0210112 | A1 | 9/2006 | Cohen et al. |
| 2006/0211462 | A1 | 9/2006 | French et al. |
| 2006/0239558 | A1 | 10/2006 | Rafii et al. |
| 2007/0013718 | A1 | 1/2007 | Ohba |
| 2007/0060336 | A1 | 3/2007 | Marks et al. |
| 2007/0098222 | A1 | 5/2007 | Porter et al. |
| 2007/0124694 | A1 | 5/2007 | Van De Sluis et al. |
| 2007/0216894 | A1 | 9/2007 | Garcia et al. |
| 2007/0260984 | A1 | 11/2007 | Marks et al. |
| 2007/0279485 | A1 | 12/2007 | Ohba et al. |
| 2007/0283296 | A1 | 12/2007 | Nilsson |
| 2007/0294639 | A1 | 12/2007 | Van Berkel et al. |
| 2007/0298882 | A1 | 12/2007 | Marks et al. |
| 2008/0001951 | A1 | 1/2008 | Marks et al. |
| 2008/0013793 | A1 | 1/2008 | Hillis et al. |
| 2008/0062257 | A1 | 3/2008 | Corson |
| 2008/0100620 | A1 | 5/2008 | Nagai et al. |
| 2008/0111710 | A1 | 5/2008 | Boillot |
| 2008/0117168 | A1 | 5/2008 | Liu et al. |
| 2008/0126937 | A1 | 5/2008 | Pachet |
| 2008/0134102 | A1 | 6/2008 | Movold et al. |
| 2008/0152191 | A1 | 6/2008 | Fujimura et al. |
| 2008/0187178 | A1 | 8/2008 | Shamaie |
| 2008/0214253 | A1 | 9/2008 | Gillo et al. |
| 2008/0215679 | A1 | 9/2008 | Gillo et al. |
| 2008/0215972 | A1 | 9/2008 | Zalewski et al. |
| 2008/0215973 | A1 | 9/2008 | Zalewski et al. |
| 2008/0256494 | A1 | 10/2008 | Greenfield |
| 2009/0017910 | A1 | 1/2009 | Rofougaran et al. |
| 2009/0058850 | A1 | 3/2009 | Fun |
| 2009/0104993 | A1 | 4/2009 | Ye |
| 2009/0141933 | A1 | 6/2009 | Wagg |
| 2009/0167679 | A1 | 7/2009 | Klier et al. |
| 2009/0217211 | A1* | 8/2009 | Hildreth .......... G06F 3/017 715/863 |
| 2009/0221368 | A1 | 9/2009 | Yen et al. |
| 2009/0228841 | A1 | 9/2009 | Hildreth |
| 2010/0041478 | A1 | 2/2010 | Ajioka et al. |
| 2010/0103106 | A1 | 4/2010 | Chui |
| 2010/0111358 | A1 | 5/2010 | Chai et al. |
| 2010/0166258 | A1 | 7/2010 | Chai et al. |
| 2010/0210359 | A1 | 8/2010 | Krzeslo et al. |
| 2010/0222144 | A1 | 9/2010 | Ohba et al. |
| 2017/0228184 | A1 | 8/2017 | Kuznetsov et al. |

FOREIGN PATENT DOCUMENTS

| | | |
|---|---|---|
| JP | H0844490 A | 2/1996 |
| JP | 2000163178 A | 6/2000 |
| WO | 9310708 A1 | 6/1993 |
| WO | 9717598 A1 | 5/1997 |
| WO | 9915863 A1 | 4/1999 |
| WO | 9944698 A2 | 9/1999 |
| WO | 0159975 A3 | 1/2002 |
| WO | 02082249 A2 | 10/2002 |
| WO | 03001722 A3 | 3/2003 |
| WO | 03046706 A1 | 6/2003 |
| WO | 03071410 A2 | 8/2003 |
| WO | 03073359 A3 | 11/2003 |
| WO | 03054683 A3 | 12/2003 |
| WO | 03071410 A3 | 3/2004 |
| WO | 2009059065 A1 | 5/2009 |

OTHER PUBLICATIONS

"B.C. Explorer Interactive 3D Display, Beijing Olympics", Retrieved from <<http://www.gesturetek.com/3ddepth/businesscases/3dexplorer.php>>, Jul. 2008, 2 Pages.

"Simulation and Training", Division Interactive, 1994, 6 Pages.

"Final Office Action Issued in U.S. Appl. No. 12/363,094", dated Sep. 28, 2012, 10 Pages.

"Final Office Action Issued in U.S. Appl. No. 12/363,094", dated Feb. 27, 2014, 13 Pages.

(56) References Cited

OTHER PUBLICATIONS

"Final Office Action Issued in U.S. Appl. No. 12/363,094", dated Jul. 14, 2015, 22 Pages.
"Final Office Action Issued in U.S. Appl. No. 12/363,094", dated Oct. 14, 2016, 13 Pages.
"Non-Final Office Action Issued in U.S. Appl. No. 12/363,094", dated May 16, 2012, 11 Pages.
"Non-Final Office Action Issued in U.S. Appl. No. 12/363,094", dated Feb. 25, 2016, 13 Pages.
"Non-Final Office Action Issued in U.S. Appl. No. 12/363,094", dated Dec. 12, 2014, 13 Pages.
"Non-Final Office Action Issued in U.S. Appl. No. 12/363,094", dated Oct. 7, 2013, 12 Pages.
"Notice of Allowance Issued in U.S. Appl. No. 12/363,094", dated Jan. 13, 2017, 23 Pages.
"Virtual High Anxiety", In Proceedings of the Tech Update, Aug. 1, 1995, 22 Pages.
"Non Final Office action Issued in U.S. Appl. No. 13/407,428", dated Aug. 6, 2013,12 Pages.
Aggarwal, et al., "Human Motion Analysis: A Review", In Proceedings of the Computer Vision and Image Understanding, vol. 73, Issue 3, Jun. 16, 1997, pp. 428-440.
Azarbayejani, et al., "Visually Controlled Graphics", In Proceedings of the IEEE Transactions on Pattern Analysis and Machine Intelligence, vol. 15, Issue 6, Jun. 1, 1993, pp. 602-605.
Baratoff, et al., "Gesture Recognition", Retrieved from: https://web.archive.org/web/20081205080335/http://www.hitl.washington.edu/scivw/EVE/I.D.2.b.GestureRecognition.html, Retrieved Date: Apr. 7, 2009, 4 Pages.
Baudel, et al., "CHARADE: Remote Control of Objects using Free-Hand Gestures", In Proceedings of the Communications of the ACM—Special Issue on Computer Augmented Environments: Back to the Real World, vol. 36, Issue 7, Jul. 1, 1993, 10 Pages.
Bolt, Richard A. "Put-That-There: Voice and Gesture at the Graphics Interface", In Proceedings of the 7th Annual Conference on Computer Graphics and Interactive Techniques, Jul. 14, 1980, pp. 262-270.
Breen, et al., "Interactive Occlusion and Collision of Real and Virtual Objects in Augmented Reality", In Technical Report of European Computer Industry Research Center-95-02 Jan. 1, 1995, 22 Pages.
Brogan, et al., "Dynamically Simulated Characters in Virtual Environments", In Proceedings of the IEEE Computer Graphics and Applications, vol. 18, Issue 5, Sep. 1, 1998, pp. 58-69.
Chen, et al., "Multi-object tracking using dynamical graph matching", In Proceedings of the IEEE Computer Society Conference on Computer Vision and Pattern Recognition, Dec. 8, 2001, pp. 210-217.
Fisher, et al., "Virtual Environment Display System", In Proceedings of the ACM Workshop on Interactive 3D graphics, Oct. 23, 1986, pp. 77-87.
Freeman, et al., "Television Control by Hand Gestures", In Proceedings of the IEEE International Workshop on Automatic Face and Gesture Recognition, Jun. 26, 1995, 5 Pages.
Gabriel, et al., "The state of the art in multiple object tracking under occlusion in video sequences", In Published in Advanced Concepts for Intelligent Vision Systems, Sep. 1, 2003, 8 Pages.
Gingichashvili, Sarah "PlayAnywhere—Microsoft's Interactive Playground", Retrieved from: http://web.archive.org/web/20100507045636/http://thefutureofthings.com/news/1037/playanywhere-microsofts-interactive-playground.html, Nov. 2, 2007, 2 Pages.
Granieri, et al., "Simulating Humans in VR", In the British Computer Society, Academic Press, Oct. 12, 1994, 15 Pages.
Hasegawa, et al., "Human-Scale Haptic Interaction with a Reactive Virtual Human in a Real-Time Physics Simulator", In Proceedings of the ACM SIGCHI International Conference on Advances in Computer Entertainment Technology, Jun. 15-17, 2005, pp. 149-155.
He, Lei "Generation of Human Body Models", In Thesis Submitted in Partial Fulfillment of the Requirements for the Degree of Master of Science in Computer Science, Apr. 1, 2005, 111 Pages.
Hinckley, et al., "Passive Real-world Interface Props for Neurosurgical Visualization", In Proceedings of the SIGCHI Conference on Human Factors in Computing Systems, Apr. 24, 1994, pp. 452-458.
Hongo, et al., "Focus of Attention for Face and Hand Gesture Recognition Using Multiple Cameras", In Proceedings of the Fourth IEEE International Conference on Automatic Face and Gesture Recognition, Mar. 28, 2000, 6 Pages.
Isard, et al., "CONDENSATION—Conditional Density Propagation for Visual Tracking", In Article in International Journal of Computer Vision, vol. 29, Issue 1, Jan. 1, 1998, 24 Pages.
Jones, et al., "An Evaluation of Integrated Zooming and Scrolling on Small-Screens", In International Journal of Human-Computer Studies, Dec. 9, 2008, 26 Pages.
Kohler, Markus "Special Topics of Gesture Recognition Applied in Intelligent Home Environments", In Proceedings of the International Gesture Workshop on Gesture and Sign Language in Human-Computer Interaction, Sep. 17, 1997, 12 Pages.
Kohler, Markus "Technical Details and Ergonomical Aspects of Gesture Recognition Applied in Intelligent Home Environments", Retrieved from: https://pdfs.semanticscholar.org/0210/daa859d8574b1e1f98f809814e83022c75e4.pdf, Jan. 1, 1997, 35 Pages.
Kohler, Markus "Vision Based Remote Control in Intelligent Home Environments", In Journal of 3D Image Analysis and Synthesis, vol. 96, Nov. 1, 1996, pp. 147-154.
Laviola, Jr., Joseph J. "Bringing VR and Spatial 3D Interaction to the Masses through Video Games", In Proceedings of the IEEE Computer Graphics and Applications, vol. 28, Issue 5, Sep. 1, 2008, pp. 10-15.
Livingston, Mark Alan "Vision-based Tracking with Dynamic Structured Light for Video See-through Augmented Reality", A Dissertation Submitted to the Faculty of the University of North Carolina at Chapel Hill in Partial Fulfillment of the Requirements for the Degree of Doctor of Philosophy in the Department of Computer Science, Jan. 1, 1998, 145 Pages.
MacCormick, et al., "A Probabilistic Exclusion Principle for Tracking Multiple Objects", In Proceedings of the Seventh IEEE International Conference on Computer Vision, Sep. 20, 1999, 31 Pages.
McKenna, et al., "Tracking groups of people", In Journal of Computer Vision and Image Understanding, vol. 80, Issue 1, Oct. 1, 2000, 15 Pages.
Miyagawa, et al., "CCD-Based Range Finding Sensor", In Proceedings of the IEEE Transactions on Electron Devices, vol. 44, Issue 10, Oct. 1, 1997, 5 Pages.
Ong, et al., "Deciphering Gestures with Layered Meanings and Signer Adaptation", In Proceedings of the 6th IEEE International Conference on Automatic Face and Gesture Recognition, May 19, 2004, 6 Pages.
Pavlovic, et al., "Visual Interpretation of Hand Gestures for Human-Computer Interaction: A Review", In Proceedings of the IEEE Transactions on Pattern Analysis and Machine Intelligence, vol. 19, Issue 7, Jul. 1, 1997, pp. 677-678.
Penny, et al., "Traces: Wireless Full Body Tracking in the Cave", In Proceedings of the 9th International Conference on Artificial Reality and Telexistence, Dec. 1, 1999, 9 Pages.
Qian, et al., "A Gesture-Driven Multimodal Interactive Dance System", In Proceedings of the IEEE International Conference on Multimedia and Expo, vol. 3, Jun. 27, 2004, pp. 1579-1582.
Rosenhahn, et al., "Automatic Human Model Generation", In Proceedings of the International Conference of Computer Analysis of Images and Patterns, Sep. 5, 2005, 8 Pages.
Shao, et al., "An Open System Architecture for a Multimedia and Multimodal User Interface", Retrieved From: http://www.dinf.net/doc/english/Us_Eu/conf/tide98/84/shao_schroter.html, Aug. 24, 1998, 8 Pages.
Sheridan, et al., "Virtual Reality Check", In Journal of Technology Review, vol. 96, Issue 7, Oct. 1, 1993, 9 Pages.
Shin, et al., "Towards Perceptual Interface for Visualization Navigation of Large Data Sets", Retrieved From: http://citeseerx.ist.psu.edu, Dec. 9, 2008, 6 Pages.

(56) References Cited

OTHER PUBLICATIONS

Shivappa, et al., "Person Tracking With Audio-visual Cues Using Iterative Decoding Framework", In Proceedings of the IEEE 5th International Conference on Advanced Video and Signal Based Surveillance, Sep. 1, 2008, pp. 260-267.

Sridhar, et al., "Multiple Camera, Multiple Person Tracking with Pointing Gesture Recognition in Immersive Environments", In Proceedings of the 4th International Symposium on Advances in Visual Computing, Dec. 1, 2008, pp. 508-519.

Stevens, Jane E. "Flights into Virtual Reality Treating Real World Disorders", In the Washington Post on Science Psychology, Mar. 27, 1995, 2 Pages.

Tollmar, et al., "Gesture + Play", Retrieved from: http://www.ai.mit.edu/research/abstracts/abstracts2002/user-interfaces/29tollmar.pdf, Jan. 1, 2009, pp. 419-420.

Wilson, Andrew D. "PlayAnywhere: A Compact Interactive Tabletop Projection-Vision System", In Proceedings of the 18th Annual ACM Symposium on User Interface Software and Technology, Oct. 23, 2005, 10 Pages.

Woo, et al., "Sketch on Dynamic Gesture Tracking and Analysis Exploiting Vision-based 3D Interface", In Proceedings of the Visual Communications and Image Processing, vol. 4310, Dec. 29, 2000, pp. 656-666.

Wren, et al., "Pfinder: Real-Time Tracking of the Human Body", In Proceedings of the IEEE Transactions on Pattern Analysis and Machine Intelligence, vol. 19, Issue 7, Jul. 1, 1997, pp. 780-785.

Wu, et al., "A Virtual 3D Blackboard: 3D Finger Tracking using a Single Camera", In Proceedings of the 4th IEEE International Conference on Automatic Face and Gesture Recognition, Dec. 9, 2008, 8 Pages.

Zhao, Liang "Dressed Human Modeling, Detection, and Parts Localization", A Dissertation Submitted in Partial Fulfillment of the Requirements for the Degree of Doctor of Philosophy at the Robotics Institute Carnegie Mellon University Pittsburgh., Jul. 26, 2001, 121 Pages.

Kanade, "A Stereo Machine for Video-Rate Dense Depth Mapping and Its New Applications," In Proceedings of the 1996 DARPA Image Understanding Workshop, Feb. 1996, 7 pages.

\* cited by examiner

NAVIGATION OF A VIRTUAL PLANE USING A ZONE OF RESTRICTION FOR CANCELING NOISE

This application is a continuation of U.S. patent application Ser. No. 12/363,094 filed on Jan. 30, 2009, the entire contents are incorporated herein by reference.

BACKGROUND

Advances in the human computer interface ("HCI") represent a new frontier in human machine interaction. Typically people interact with computers using a mouse and keyboard. Video games generally use wired or wireless controllers with a series of buttons and/or joysticks.

It is desirable to provide new modes for HCI especially for interaction with entertainment or game titles. In particular, it is desirable to allow humans to interact with computers using natural gestures using wired or wireless controllers. However, it would be advantageous to eliminate the need for a physical controller and allow humans to utilize their own bodies and gestures for interaction.

Recently, new forms of HCI have emerged using touch. A user interacts with a computer and/or entertainment device by physically touching portions of a touch interface. Typically, the touch interface is the display device itself.

Although the use of gestures for HCI are known, controlling computers or specialized entertainment devices via interpretation of human gestures in a three-dimensional context is not well known. One significant problem with touchless interaction is that there is no notion of a physical plane. That is, with touch interaction there exists a physical interface such as the glass overlay on the display device that is nonexistent in the touchless paradigm. Thus, there is a need for new forms of HCI in a three-dimensional environment.

SUMMARY

A touchless HCI provides a virtual surface in three-dimensional space. The touchless HCI may receive input regarding a user movement, process the input to generate clean gesture data and analyze at least one dynamical variable to determine an interpreted action based upon a relationship of the clean gesture data with respect to the virtual surface. In addition to the virtual surface, a zone or restriction may be defined in order to eliminate noise due to wobble of the human arm as it extends along an axis in front of a user.

A Z-In and Z-Out state may be defined to indicate whether a user has currently extended the human appendage ("HA") within the virtual surface. Dynamical variables regarding the user's interaction within and without of the virtual surface may be interpreted to determine a select action, a hover and highlight action, a drag action and a swipe action.

A data plane and associated cursor may be dynamically modified to provide feedback based upon a user's touchless interaction. The cursor may become more focused as movement along the Z dimension in front of the user is performed. Other visual display attributes may be dynamically modified to show panning and scrolling of a data plane in response to touchless user interaction.

A system for analyzing HCI in a touchless environment may include a camera, a gesture engine, a physics engine, a virtual surface, a zone of restriction and an action interpretation engine. The camera may generate a signal as a function of a 3-D environment. The signal may be received by the gesture engine, which may process the camera signal to generate a clean gesture signal. The physics engine may receive the clean gesture signal and in turn update dynamical variables associated with a human appendage, the virtual surface and the zone of restriction. The action interpretation engine may interpret the clean gesture signal as a function of the virtual surface and virtual zone of restriction.

DETAILED DESCRIPTION OF ILLUSTRATIVE EMBODIMENTS

Figure 1A:
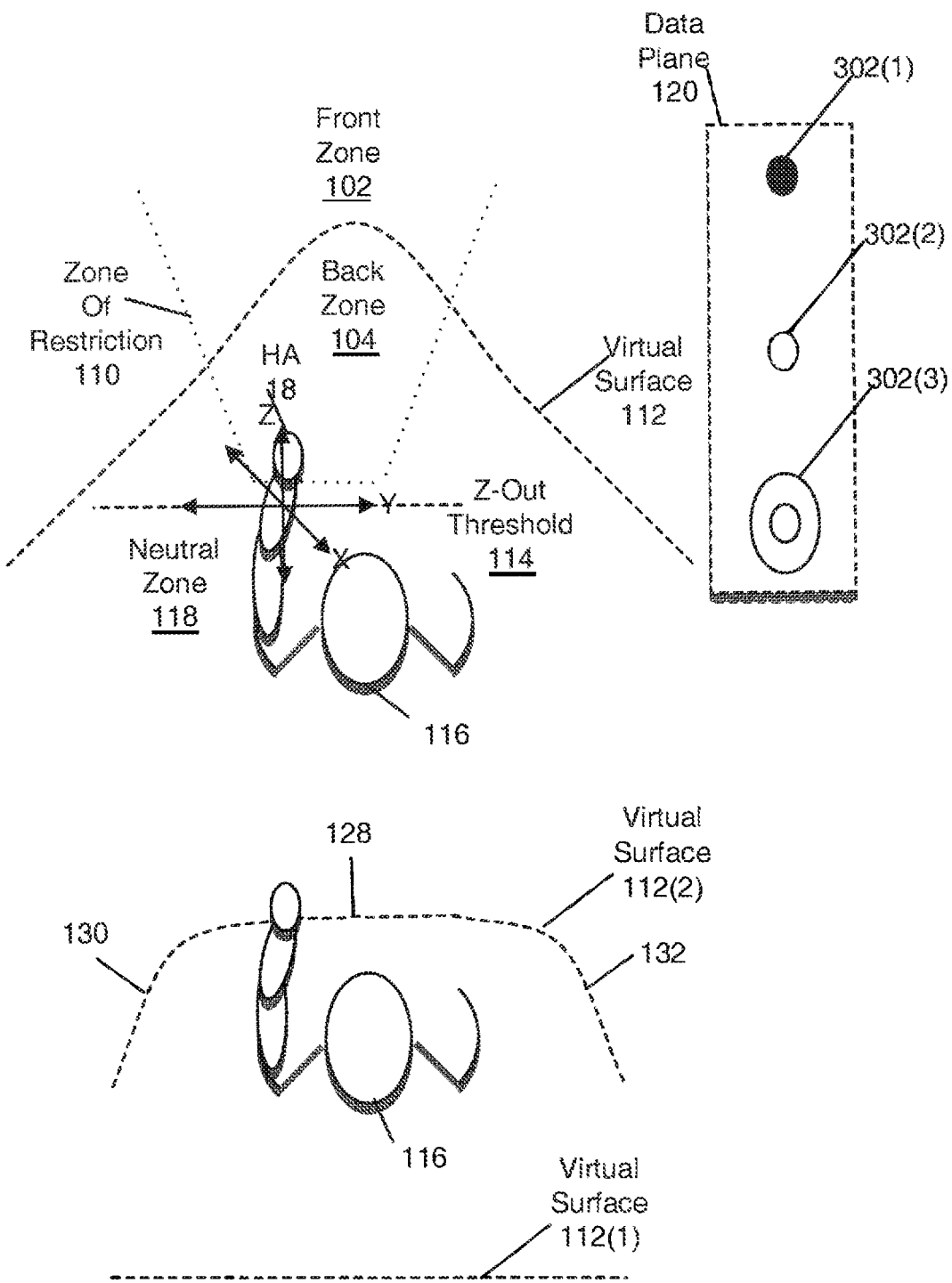
FIG. 1A depicts a virtual surface and zone of restriction in relation to a user.

FIG. 1A depicts a virtual surface and zone of restriction in relation to a user. User 116 may interact with a computer and/or entertainment device (not shown) in a touchless manner through movement and gesture in three dimensions. Any element or aspect of human movement may be used for interaction with the 3-D environment. In particular, as described in detail below, an orientation or a human appendage ("HA") 18 within the 3-D environment may be utilized for touchless interaction. According to one embodiment, HA 18 is a hand of user 116. As described in detail below, the orientation of HA 18 (e.g., hand) within 3-D space is analyzed to interpret gestures as specific actions.

Virtual surface 112 comprises an imaginary surface of arbitrary shape. The surface is "virtual" in the sense that its dimensions, extent and geometry are not physically manifested but are instead imaginary and represented in a computing device (not shown in FIG. 1A). User 116 may move within a 3-dimensional environment as represented by X, Y and Z axes. According to one embodiment, the geometry of virtual surface 112 is constant in the X dimension as shown in FIG. 1A but variable in the Y and Z dimensions as shown in FIG. 1A. However, according to alternative embodiments, virtual surface 112 may be variable in all dimensions.

Virtual surface may be planer in shape, e.g., 112(1). According to one embodiment, virtual surface extends around user 116 in a manner to suit the ergonomics of the human body. According to this embodiment, virtual surface 112 comprises flat portion 128 directly in front of user 116, first curved portion to the left 130 and second curved portion right 132 of user 116, e.g., 112(2). Virtual surface 112 may be fixed in space. However, instead virtual surface 112 may be variable in space, its origin moving as a function of a location of user 116. That is, according to one embodiment, an origin of virtual surface 112 is located at a point such as the center of mass ("COM") of user 116. Thus, for example, the origin of the virtual surface 112 may move in conjunction with the location of the solar plexus, for example relative to the chest of user 116. A method to accomplish this is described below. Furthermore, the geometry of virtual surface may be customized to individual users 116.

User interaction within the 3-D environment is interpreted with respect to an orientation of HA 18, for example an arm, in relation to virtual surface as will become evident as the method and system is further described. A front zone 102, back zone 102 and neutral zone 18 are respectively defined in front and in back of virtual surface 112, which may be used in specific contexts to interpret gestures as described in detail below.

Z-out threshold 114 may define a threshold or reference point along the Z-axis, which is used to interpret gestures as described in detail below. For example, movement of arm 18 may be determined within the Z dimension. Accordingly, Z-Out threshold 114 may be utilized to determine whether HA 18 should be considered in back of virtual surface 112. According to one embodiment, it is desirable to define a "neutral" 18 or "no action" zone close to the user's chest out to Z-out threshold 114. Until HA 18 extends forward beyond neutral zone no gestures are interpreted.

Due to the geometry of the human body, as user 116 zooms in and out along the Z-axis the human hand tends to diverge from movement along a straight line. According to empirical measurements, the wobble tends to become move pronounced in the X and Y dimensions as the z coordinated increases (in the forward direction). In other words, there exists a natural wobble clue to the geometry of the human arm and hand and the bone configuration. According to one embodiment, this wobble, which may be viewed as noise, must be canceled in order to achieve accurate interpretation of human gestures.

FIG. 1A shows zone of restriction 110, which is a mathematical construct devised to compensate for this natural wobble. Similar to virtual surface 112, zone of restriction 110 is virtual and thereby represented purely inside a computational device. Zone of restriction 110, similar to virtual surface 112, may also have a variable origin as a function of a point on the human such as COM. According to one embodiment, zone of restriction 110 is an area or perimeter in the X and Y dimensions and is a function of the z coordinate alone.

$$\text{Zone\_Restriction}(z) = f(X(z), Y(z))$$

Zone of restriction 110 defines a level of sensitivity to movement of HA 18 within the X and Y dimensions. The larger the area of the zone as a function of the z coordinate, the less sensitive the system is to wobble. In order to compensate for the natural wobble of the human arm movement, zone of restriction 110 may be a conical shape. That is, at the beginning of the cone, the system is more sensitive to movement in the X and Y dimensions while as HA 18 moves forward, the system becomes less sensitive to variations in X and Y dimensions. This results in cancellation of X and Y wobble or noise. Zone of restriction 110 may be a linear or nonlinear function of z.

In other words, zone of restriction 110 provides a mathematical definition for noise cancellation due to natural wobble due to the geometry of the human arm. Viewed from another perspective, zone of restriction 110 represents the certainty of a selection event occurring. The more certain that a select event will occur (the closer HA 18 is in front of virtual surface 112), the more noise is eliminated.

FIG. 1A also shows data plane 120, which is used to display data in a display configuration as controlled by actions as interpreted human gestures. For example, data plane may display text or graphics information that user 116 is viewing. As user 116 may perform gestures in three dimensions and thus the distance from virtual surface 112 to HA 18 may be essential feedback to user 116. FIG. 1A also shows exemplary dynamics of a cursor displayed in data plane 120 in relation to the location of HA 18 in the Z dimension.

Thus, as shown in FIG. 1A, cursor 302(1), 302(2) and 302(3) may be dynamically modified as a function of a Z dimension distance of HA 18 from virtual surface 112. Thus, for example cursor 302(1) may be displayed when HA is in front zone 102, cursor 302(2) is displayed when HA is in a middle position and cursor 302(3) is display when HA 11 is in back zone 104. The cursor variations shown in FIG. 1A are merely exemplary, and any display pattern and dynamics for cursor 302 may be defined. In general, according to one embodiment, when HA is close to the human body, cursor 302 is displayed as several concentric rings. As HA 18 moves closer to virtual surface 112, cursor 302 may become more focused such as a bull's-eye pattern.

Display of cursor 302 may also be dynamically modified depending upon a mode as determined by an action interpreted based upon a human gesture. For example, if an item on data plane 120 is selected cursor 302 may be displayed in a manner to signal that a selection has occurred.

According to an alternative embodiment, a user may hold a simple device such as a small ball rather than use the HA alone for touchless interaction. The object such as a ball might provide feedback to the system to indicate that touchless interaction is now engaged. Further, the object might have a button that is used to signal select actions (described below). The object might also provide haptic feedback such as, for example, a rumble. The object might also employ a reflective surface that is highly visible to camera 140.

Figure 1B:
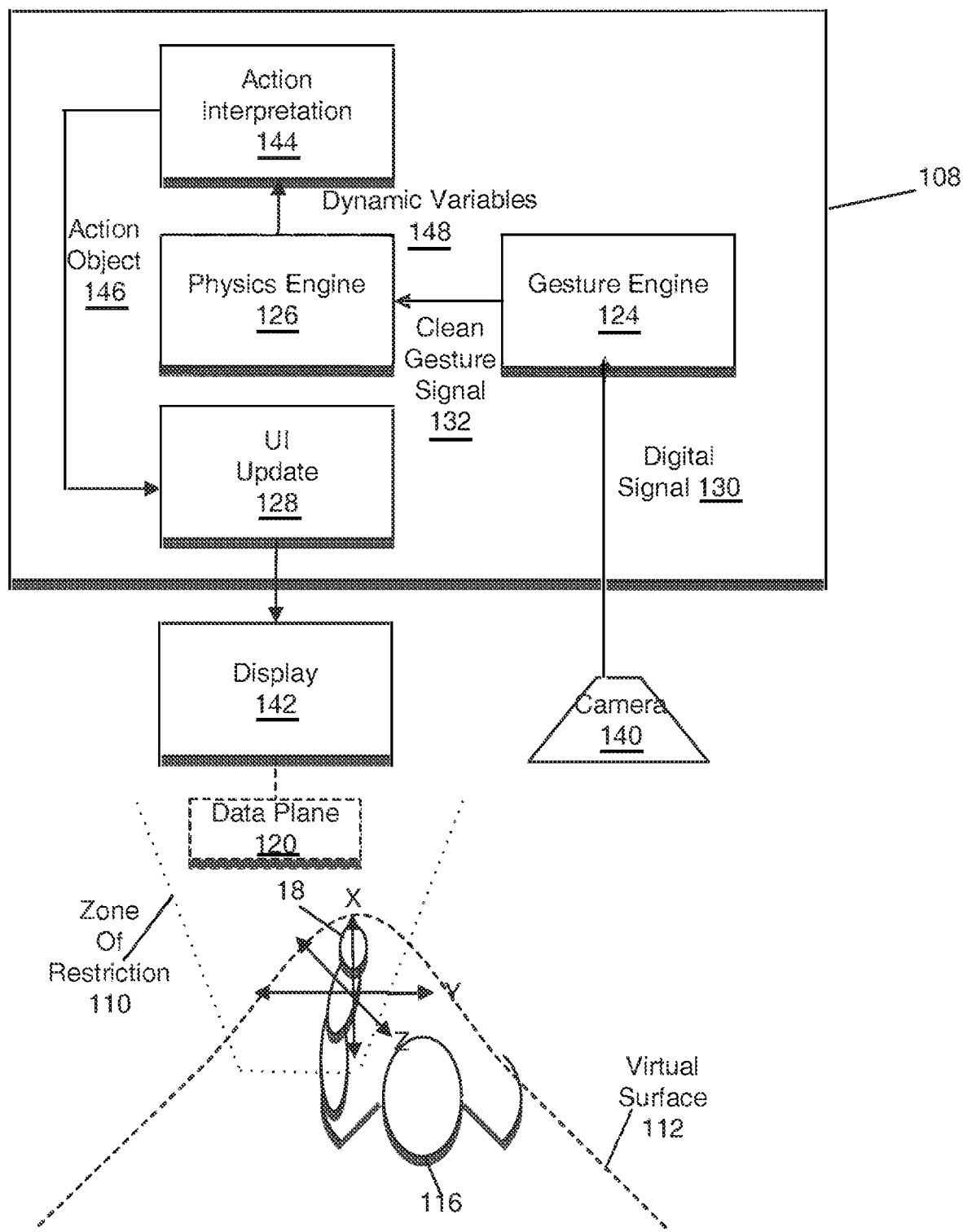
FIG. 1B shows an exemplary architecture of a system for interpreting human interaction in a touchless environment according to one embodiment.

FIG. 1B shows an exemplary architecture of a system for interpreting human interaction in a touchless according to one embodiment. User 116 may move or perform gestures in a 3-D environment. The spatial configuration of user 116 and any associated HAs 18 is received by camera 140. Camera 140 may be any type of device receiving an electromagnetic signal in the visual spectrum (light) and generating some type of output, which may be analog or digital. FIG. 1B shows specifically the output of camera 140 as digital signal 130. In the case where camera 140 generates an analog signal, it is understood that the signal is first filtered by an anti-aliasing filter and then digitized before transmission to computing device 108.

Digital signal 130 may be a sampled time series of pixel values in a three-dimensional lattice representing the time evolution of user 116 in space and time. The pixel values may be of any bit resolution and depth representing either color or grey scale data and the sampling rate may be arbitrarily adjusted based upon the a characteristic time scale of user 116 interaction.

Computing device 108 comprises gesture engine 124, physics engine 126, action interpretation module 144 and UI update module 128. Gesture engine 124 receives a digital signal 130 from camera 140 representing the spatial orientation of user 116 in a 3-D environment. Upon receiving digital signal 130 from camera 140, gesture engine 124 filters digital signal to generate clean gesture signal 132. Clean gesture signal 132 may be a time series representation of the dynamical behavior of a particular point of user 116 such as the COM of user 116. Thus, gesture engine 124 may utilize compute vision techniques such as optical flow or other techniques to isolate the dynamical behavior of a particular point of user 116 such as COM. In addition, as noted, gesture engine 124 may remove noise and/or perform other filtering of received digital signal 130.

Gesture engine 124 provides clean gesture signal 132 to physics engine 126. Physics engine 126 may generate a mathematical representation of dynamical behavior of desired point(s) such as COM on user 116 by analyzing clean gesture signal in the form of dynamic variables 148 such as spatial position. Thus, for example, physics engine 126 may generate a time series representation of the spatial location of COM of user 116. Physics engine 126 may also generate other dynamical variables such as velocity, acceleration and any other information of interest based upon clean gesture signal 132. Furthermore, physics engine 126 may provide an update of the origin location of both virtual surface 112 and zone of restriction 110 as a function of the determined current location of user 116.

Physics engine 126 provides a time series of dynamical variables representing one or more points on user 116 to action interpretation module 144. Action interpretation module converts dynamical variables representing point(s) on user 116 such as COM into an interpreted action such as a select, hover and highlight, drag, swipe, etc. as described below. In particular, action interpretation module may generate action object 146, which is a data structure representing the type of action (e.g., select, swipe, highlight and hover, drag, etc.) and other parameters describing that action and provide action object 146 to UI update module 128. Action interpretation module 144 may interpret actions based upon the orientation of HA 18 with respect to virtual surface 112 and zone of restriction 110.

UI update module receives action object 146 and uses this information to update a user interface for controlling the display data in data plane 120. UI update module 128 may also control the dynamics and visual representation of cursor 302 as a function of a current action and associated spatial orientation of user 116 and in particular HA 18.

The output of UI update 128 is provided to display 142 in order to display data plane 120, which includes a perspective view of currently viewed data and cursor 302 as a function of a current state of user 116 dynamics and spatial orientation.

Figure 2A:
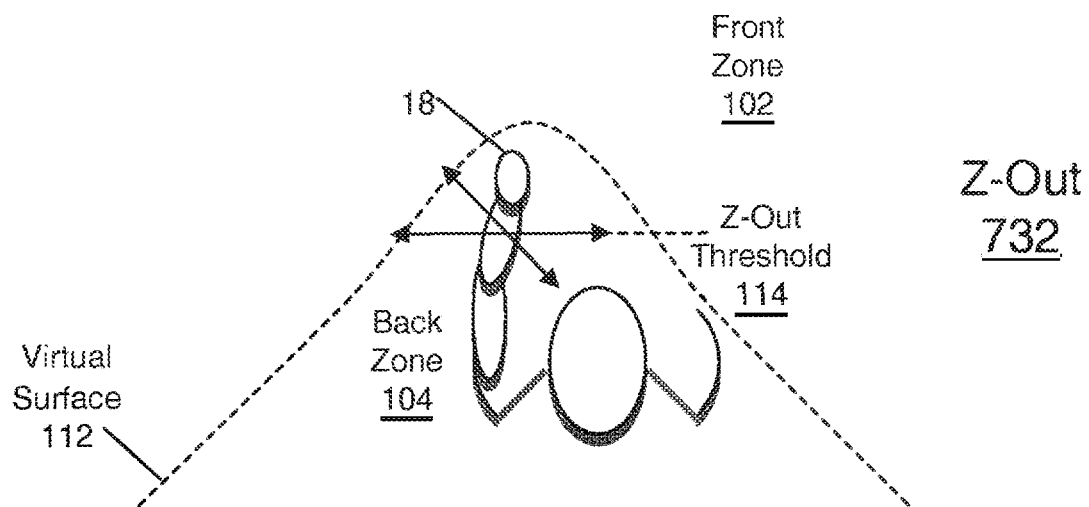
FIG. 2AA-2AB respectively illustrate a Z-Out and Z-In state.
Figure 2A:
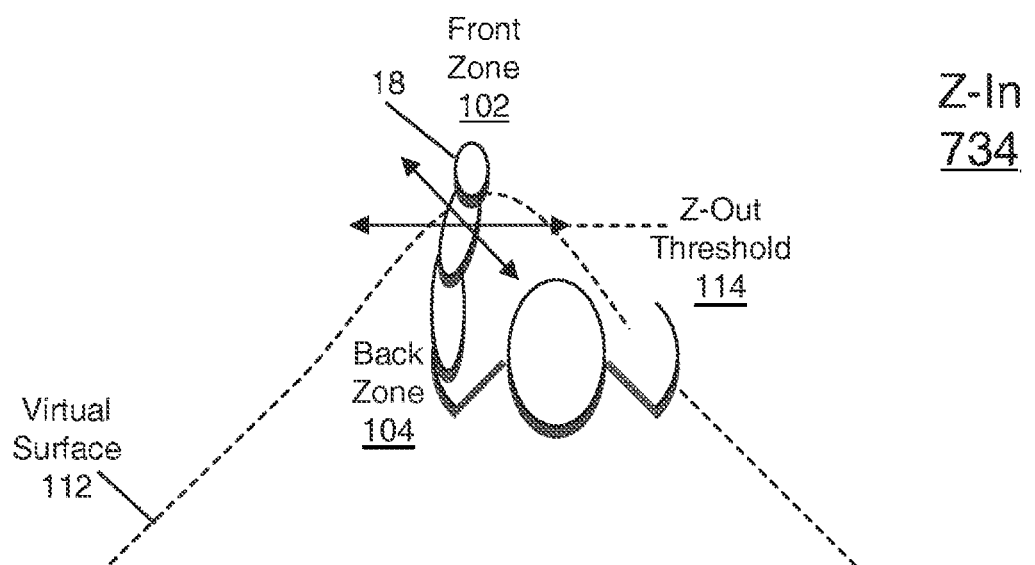

FIGS. 2AA and 2AB respectively illustrate a Z-Out and Z-In state. FIG. 2AA illustrates Z-Out state 732. Z-Out state 732 may be interpreted by action interpretation module 144 based upon dynamics information provided by physics engine 126. Z-Out state 732 is characterized by HA 18 located in back zone 104 with respect to virtual surface 112.

Conversely, as shown in FIG. 2AB, Z-In state 734 is characterized by HA 18 located in front zone 104 with respect to virtual surface 112. Z-In state 734 may be interpreted by action interpretation module 144 based upon dynamics information provided by physics engine 126.

Figure 2B:
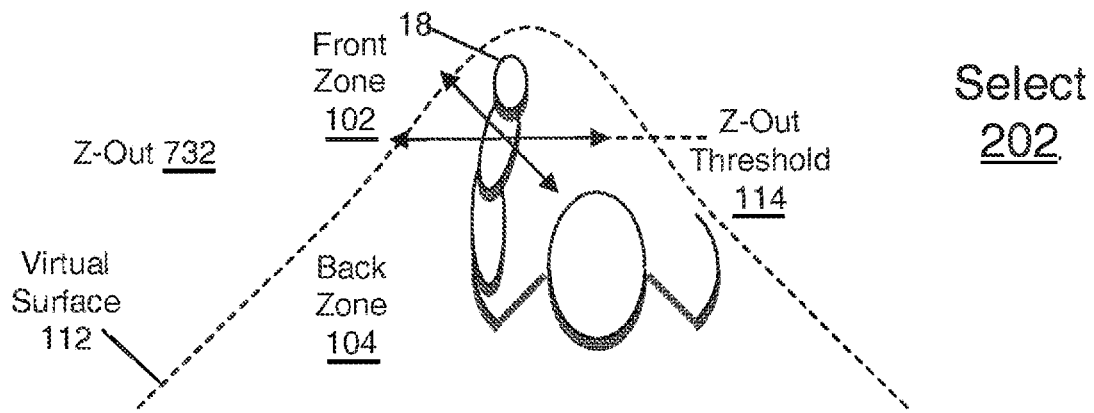
FIGS. 2BA-2BC illustrate a select action according to one embodiment.
Figure 2B:
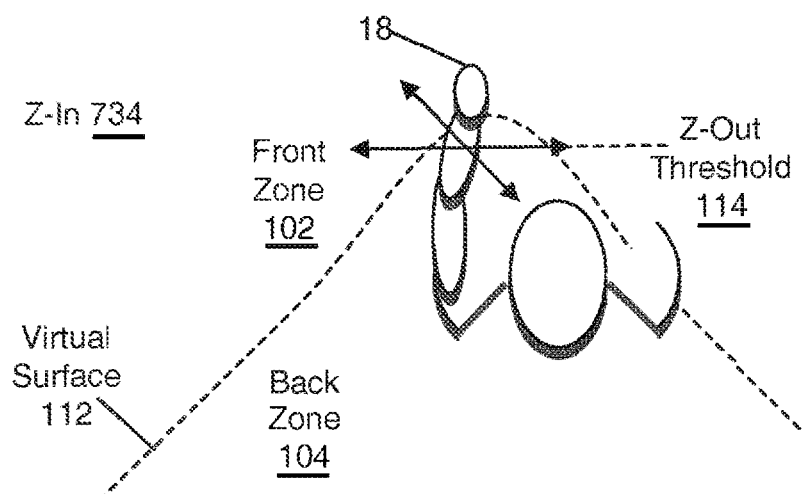
Figure 2B:
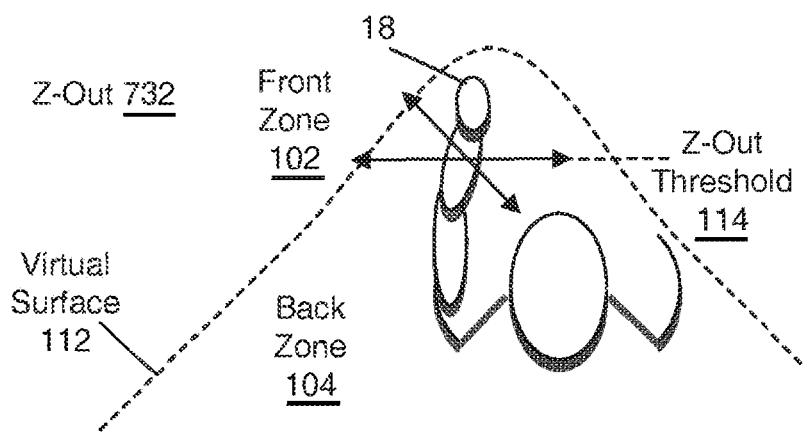

FIGS. 2BA-2BC illustrate a select action according to one embodiment. Select action 202 refers to selecting an object or item in data plane 120 (not shown in FIGS. 2BA-2BC). Select action 202 may be interpreted by action interpretation module 144 based upon dynamics information provided by physics engine 126. Select action 202 may be interpreted as the transition of HA 18 from a Z-Out 732 state (FIG. 2BA) to a Z-In state 734 (FIG. 2BB) and finally to a Z-Out state 732 (FIG. 2BC) within a predetermined time period.

Figure 2C:
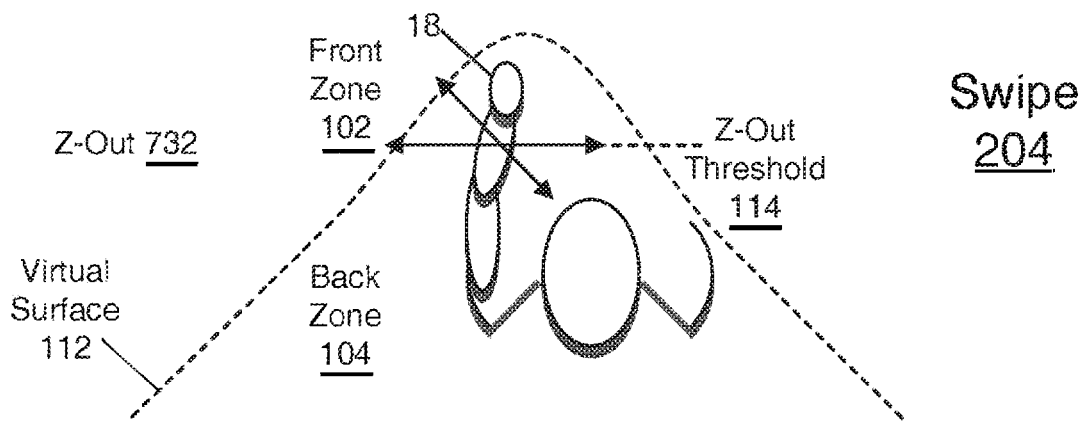
FIGS. 2CA-2CC illustrate a swipe action according to one embodiment.
Figure 2C:
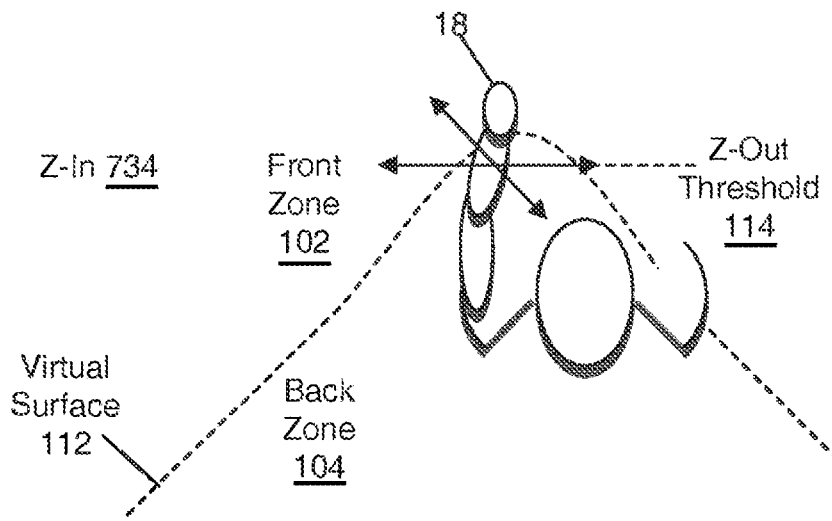
Figure 2C:
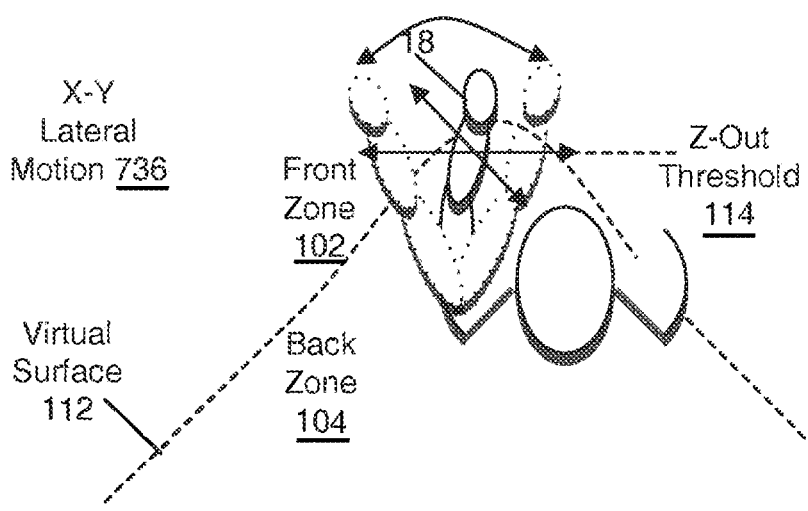

FIGS. 2CA-2CC illustrate a swipe action according to one embodiment. Swipe action 204 refers to selecting data plane 120 itself (not shown in FIGS. 2CA-2CC) and scrolling in the X and or Y dimensions (not shown in FIG. 2B). Swipe action 204 may be interpreted by action interpretation module 144 based upon dynamics information provided by physics engine 126. Swipe action 204 may be interpreted as the transition of HA 18 from a Z-Out 732 state (FIG. 2CA) to a Z-In state 734 (FIG. 2CB) and finally to X-Y lateral motion 736 (FIG. 2CC).

Figure 2D:
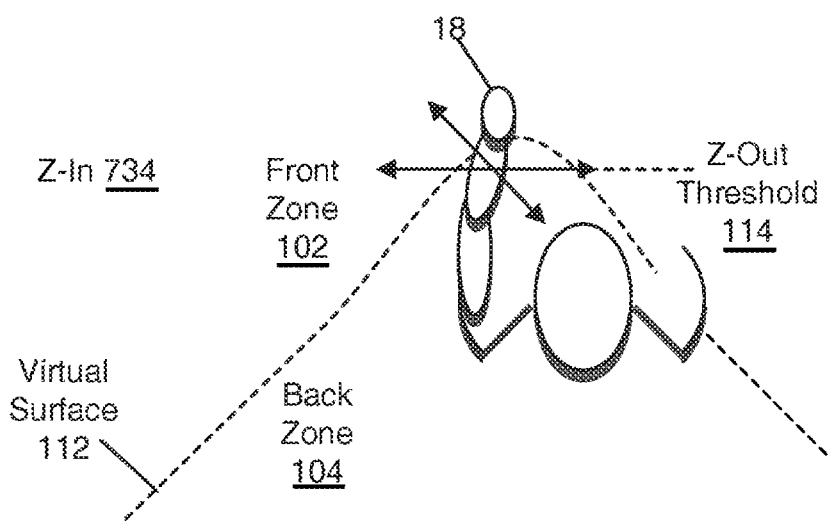
FIGS. 2DA-2DB illustrate a hover and highlight action according to one embodiment.
Figure 2D:
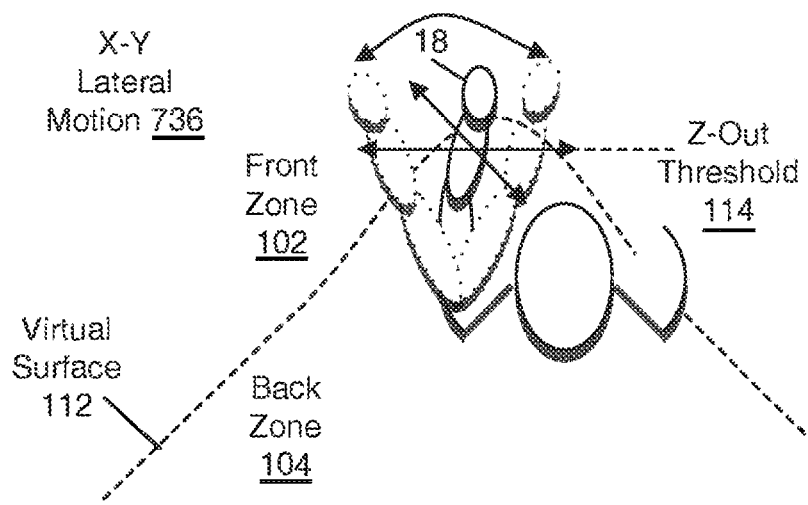

FIGS. 2DA-2DB illustrate a hover and highlight action according to one embodiment. Hover and highlight action 720 refers to hovering a cursor and/or highlighting items, objects and/or data within data plane 120 itself (not shown in FIGS. 2DA-2DB). Hover and highlight action 720 may be interpreted by action interpretation module 144 based upon dynamics information provided by physics engine 126. Hover and highlight action 204 may be interpreted as commencing from Z-In state 734 (FIG. 2DA) to X-Y lateral motion 736 (FIG. 2DB).

Figure 2E:
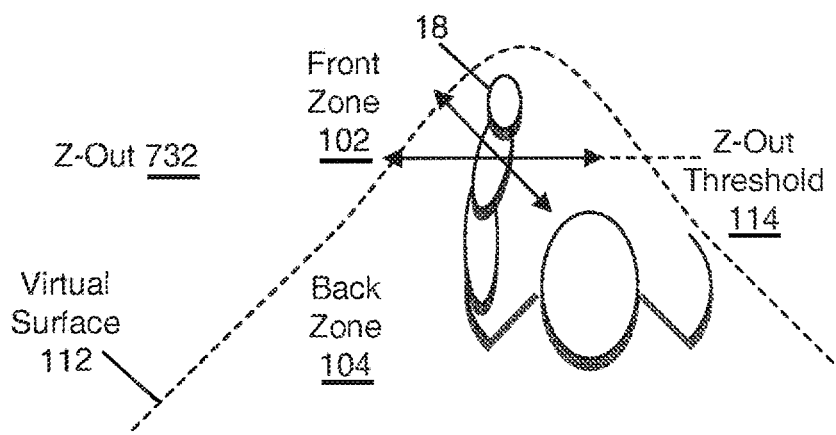
FIGS. 2EA-2EB illustrate a drag action according to one embodiment.
Figure 2E:
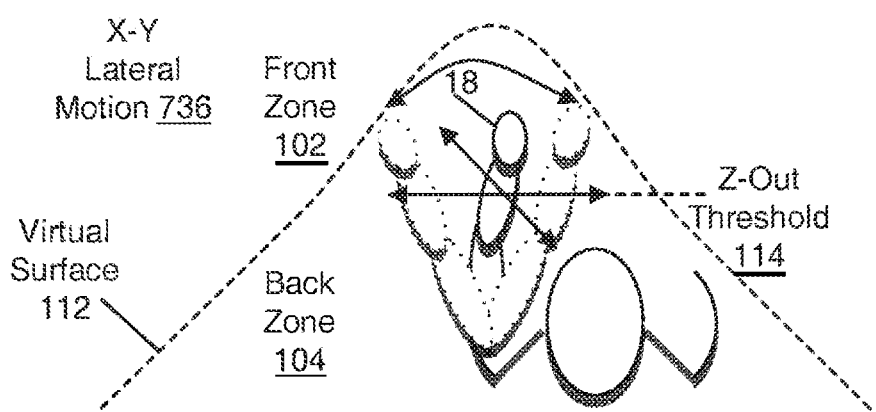

FIGS. 2EA-2EB illustrate a drag action according to one embodiment. Drag action 722 refers to dragging objects and/or data within data plane 120 itself (not shown in FIGS. 2EA-2EB). Drag action 722 may be interpreted by action interpretation module 144 based upon dynamics information provided by physics engine 126. Drag action 722 may be interpreted as commencing from Z-Out state 732 (FIG. 2EA) to X-Y lateral motion 736 (FIG. 2DB).

Figure 3A:
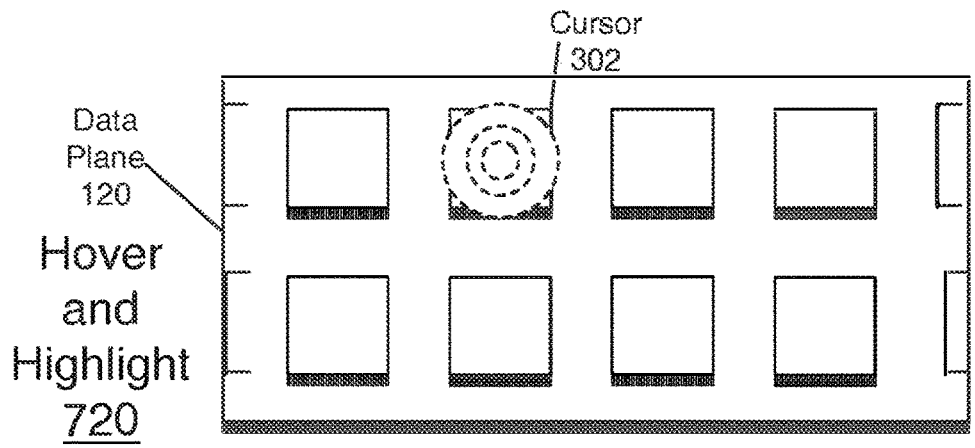
FIGS. 3AA-3AC represent an exemplary dynamical display behavior of data and a cursor within a data plane as a function of a touchless interaction according to one embodiment.
Figure 3A:
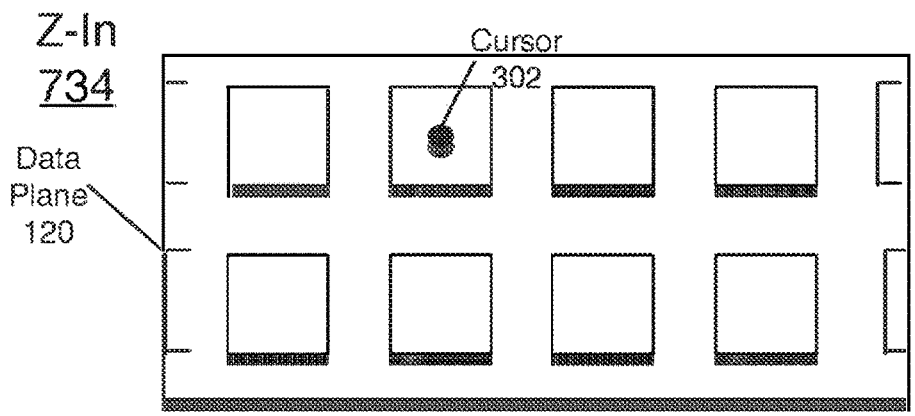
Figure 3A:
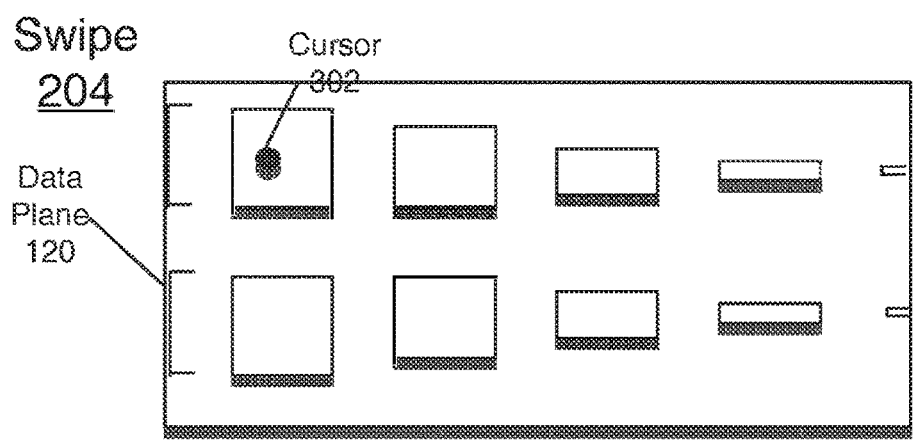

FIGS. 3AA-3AC represent an exemplary dynamical display behavior of data and a cursor within a data plane as a function of a touchless interaction according to one embodiment. FIG. 3AA shows the state of cursor 302 in highlight and hover state 720, wherein the current state is Z-Out (i.e., HA 18 in back zone 104) 114. Cursor 302 may be displayed using a ripple animation pattern to indicate to user 116 how close they are to virtual surface 112. FIG. 3AB shows the dynamics of cursor 302 as HA 18 moves forward through virtual surface 112. In particular, as shown in FIG. 3AB, cursor 302 may become focused to a small solid dot. FIG. 3AC shows an exemplary graphical display of data plane 120 after a swipe action 204 is performed. As HA 18 swipes sideways, data plane 120 slides in a lateral direction and provides a perspective display of the movement (indicated by transition from parallel to convergent lines). Cursor 302 in FIG. 3CC indicates a location of HA 18.

Figure 3B:
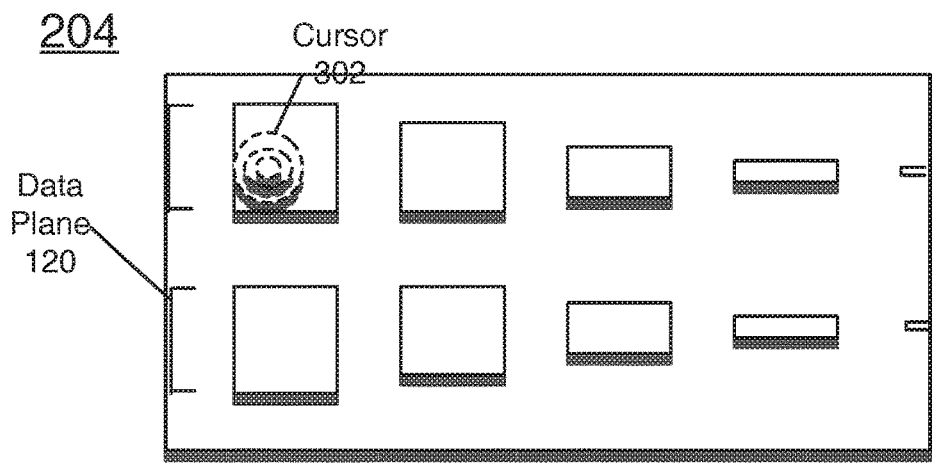
FIGS. 3BA-3BB further represent an exemplary dynamical display behavior of data and a cursor within a data plane as a function of a touchless interaction according to one embodiment.
Figure 3B:
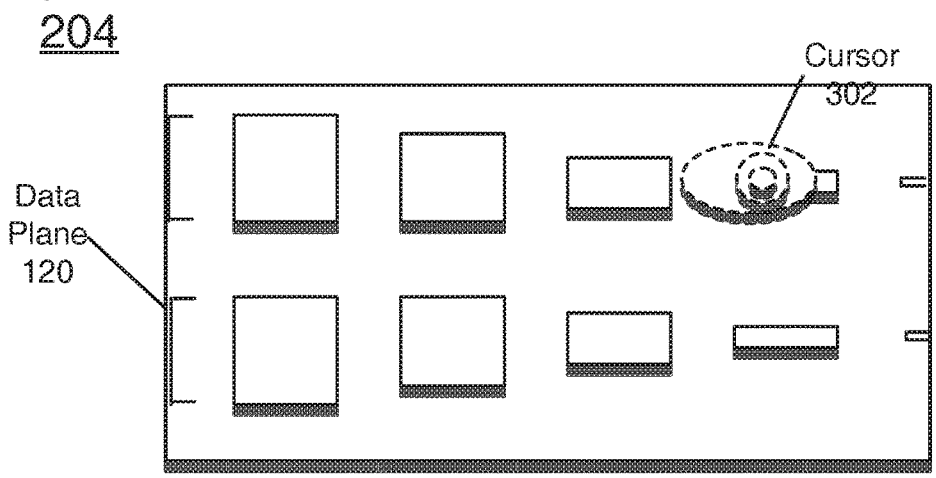

FIGS. 3BA-3BB further represent an exemplary dynamical display behavior of data and a cursor within a data plane as a function of a touchless interaction according to one embodiment. In particular, FIG. 3BA illustrates an exemplary graphical display in data plane 120 as HA 18 comes out of virtual surface 112. Cursor 302 transitions from a dot back into a ripple pattern and data plane displays objects, items and data with perspective. FIG. 3BB graphically illustrates data plane 120 as HA 18 moves to the right. Cursor 302 remains in a ripple pattern but moves to the right. Data plane 120 continues to display objects, items and data with perspective.

Figure 3C:
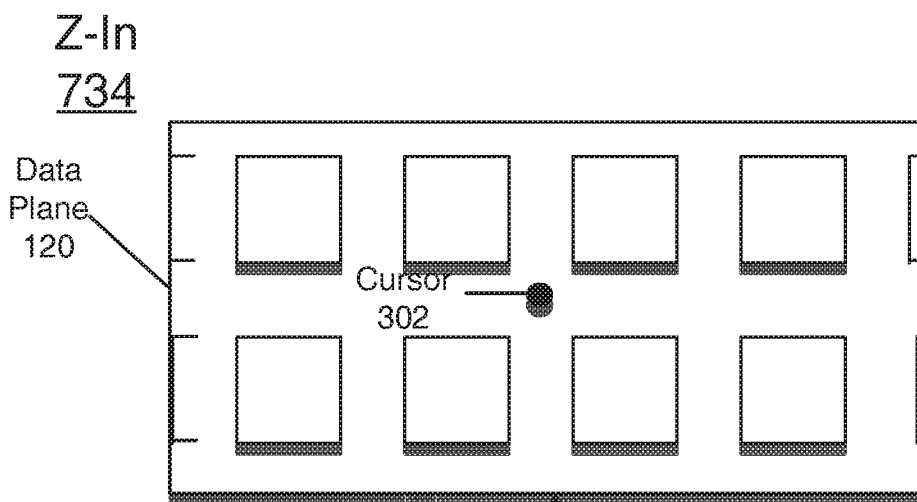
FIGS. 3CA-3CB further represent an exemplary dynamical display behavior of data and a cursor within a data plane as a function of a touchless interaction according to one embodiment.
Figure 3C:
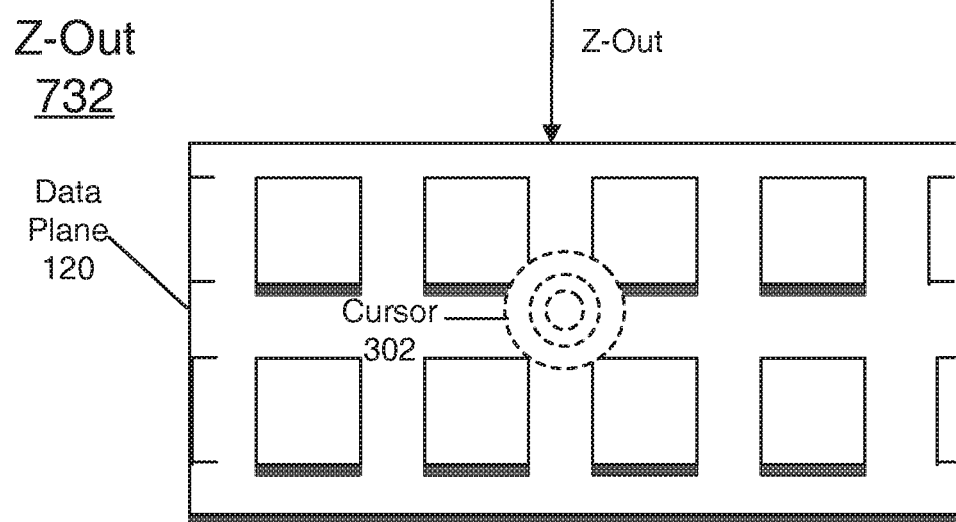

FIGS. 3CA-3CB further represent an exemplary dynamical display behavior of data and a cursor within a data plane as a function of a touchless interaction according to one embodiment. In particular, FIGS. 3CA-3CB illustrate a particular embodiment in which if a HA 18 does not signal an action to move data plane 120 in a lateral direction (right or left), after a pre-determined time period, data plane 120 shifts back to a straight-on view. According to one embodiment, this transition to a straight-on view will depend upon whether preceding the expiration of the predetermined time period the current state was Z-In 734 or Z-Out 732. In particular, if the preceding state was Z-Out 732 in FIG. 3CB, in addition to transition to a straight on display of data plane 120 cursor transitions to a ripple display. On the other hand, if the preceding state was Z-In 734, in addition to transition to a straight-on display of data plane 120, cursor 320 transition to a dot pattern and subsequent transition to a Z-Out state 732 will cause selection of an object on which cursor 302 is positioned.

Figure 3D:
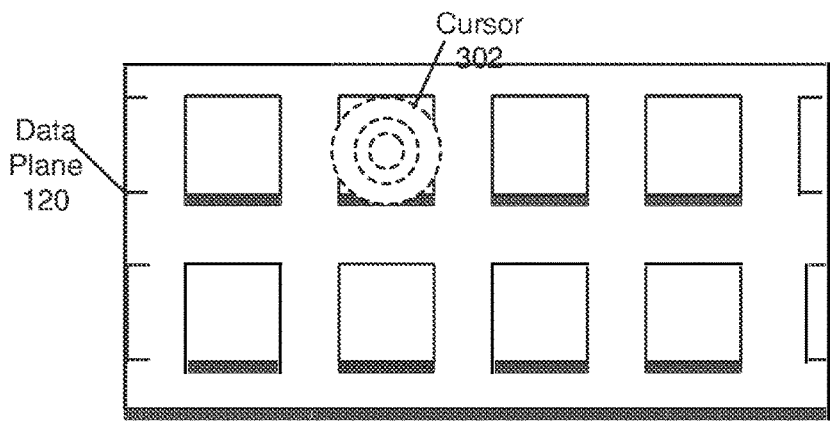
FIGS. 3DA-3DC represent an exemplary dynamical display behavior of data and a cursor within a data plane as a function of a touchless interaction according to one embodiment.
Figure 3D:
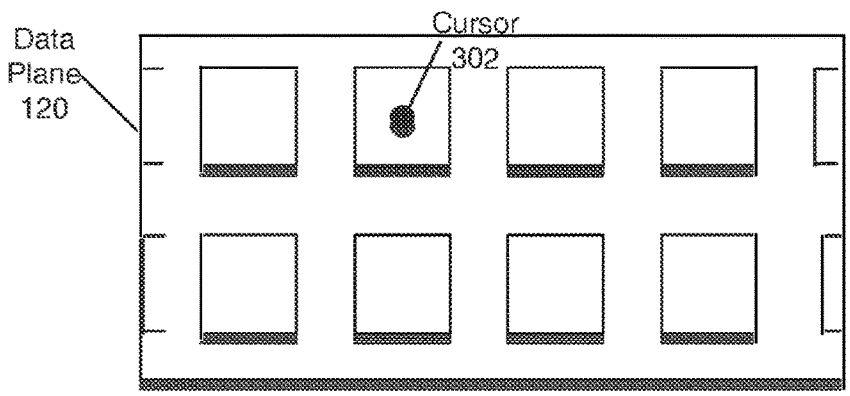
Figure 3D:
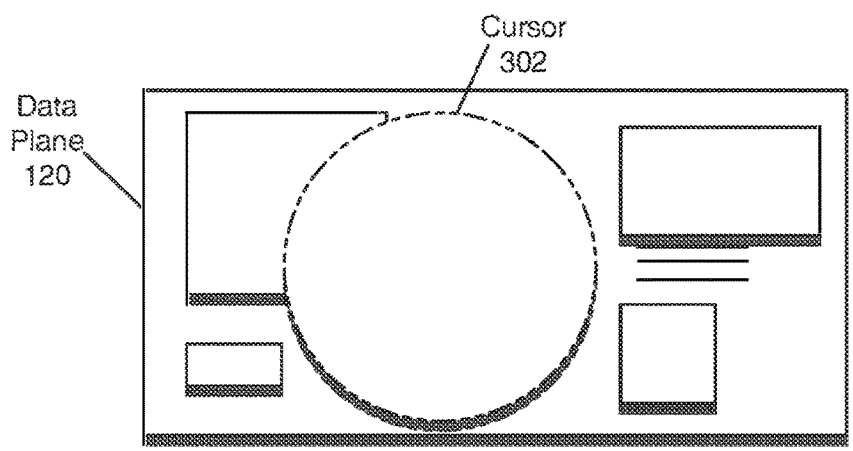

FIGS. 3DA-3DC represent an exemplary dynamical display behavior of data and a cursor within a data plane as a function of a touchless interaction according to one embodiment. FIGS. 3DA-3DC graphically illustrate the behavior of data plane 120 and cursor 302 in response to select action 202. FIG. 3DA shows the state of cursor 302 in Z-Out state 732, which may be displayed using a ripple animation pattern to indicate to user 116 how close he is to virtual surface 112. FIGS. 3DB-3DC shows the dynamics of cursor 302 as HA 18 moves forward through virtual surface 112 and back out again as the select action is performed. In particular, as shown in FIG. 3DB, cursor 302 may become focused to a small solid dot as Z-In state 734 is entered. FIG. 3DC shows an exemplary graphical display of data plane 120 after a select action 202 is completed. As HA 18 comes out of virtual surface 112 and Z-Out state 732 is entered again, cursor 302 displayed as a dot is shown in a blinking pattern to show that an object was selected. After a predetermined time period, data plane 120 zooms to display details of the selected object, item, data value or page.

Figure 4A:
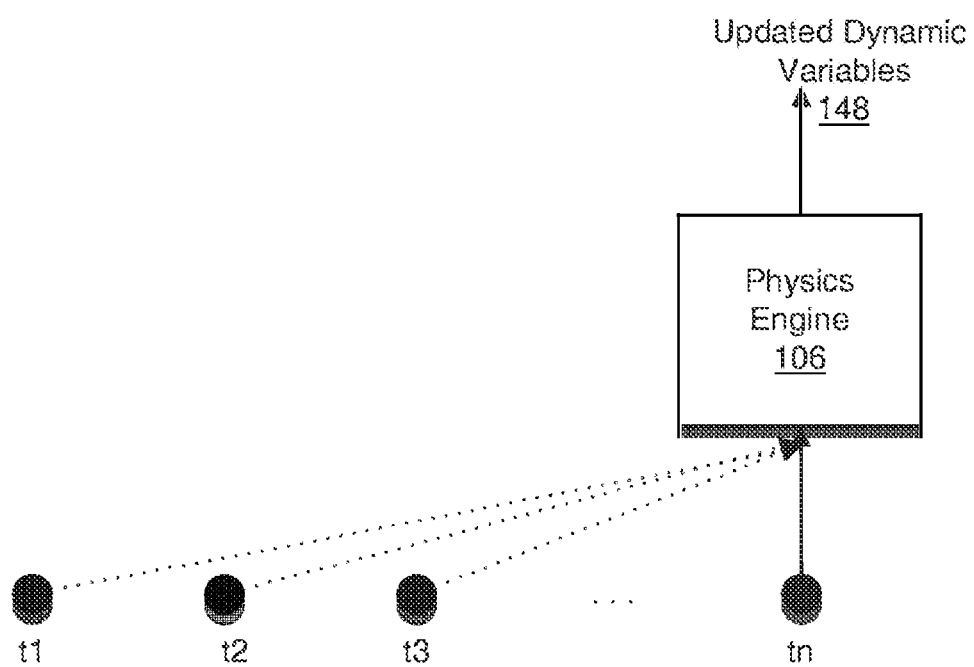
FIG. 4A illustrates an operation of a physics engine according to one embodiment.

According to an alternative embodiment, instead of changing the shape of cursor 302, upon user 116 selecting an item, or data object shown in data plane 120, the selected item in data plane 120 may be displayed to move forward and back along the Z dimension indicating that user 116 has activated that UI layer or item. Conceptually this may be analogized to reaching below a water surface to grab the UI FIG. 4A illustrates an operation of a physics engine according to one embodiment. Physics engine 106 receives a time series of data values from gesture engine 104 representing clean gesture signal 132. Physics engine outputs updated dynamic variables 148 based upon the received time series data. Dynamic variables 148 may represent time dependent spatial information for HA 18 COM of user 116 or some other point as well as other dynamic variables such as velocity and/or acceleration. In addition dynamic variables output by physics engine may further comprise current spatial location of virtual surface 112 and zone of restriction 110.

Figure 4B:
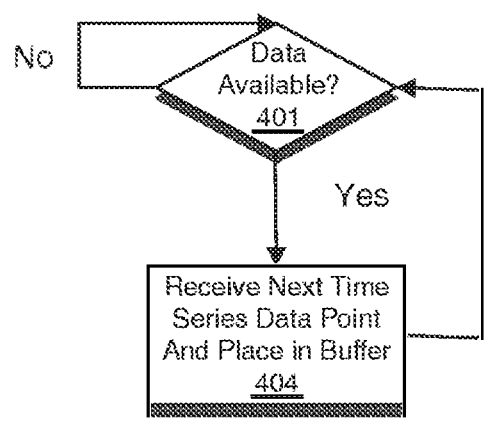
FIG. 4B is a flowchart illustrating an exemplary buffering of time series data.

FIG. 4B is a flowchart illustrating an exemplary buffering of time series data. Time series data from camera 140 may be buffered before supplying the data to gesture engine 124. In 401, it is determined whether new data is available from camera 140. If not ('No' branch of 401) flow continues with 401. If so ('Yes' branch of 401), flow continues with 404 and a next time series data point is received and placed in a buffer. Flow then continues with 401.

Figure 4C:
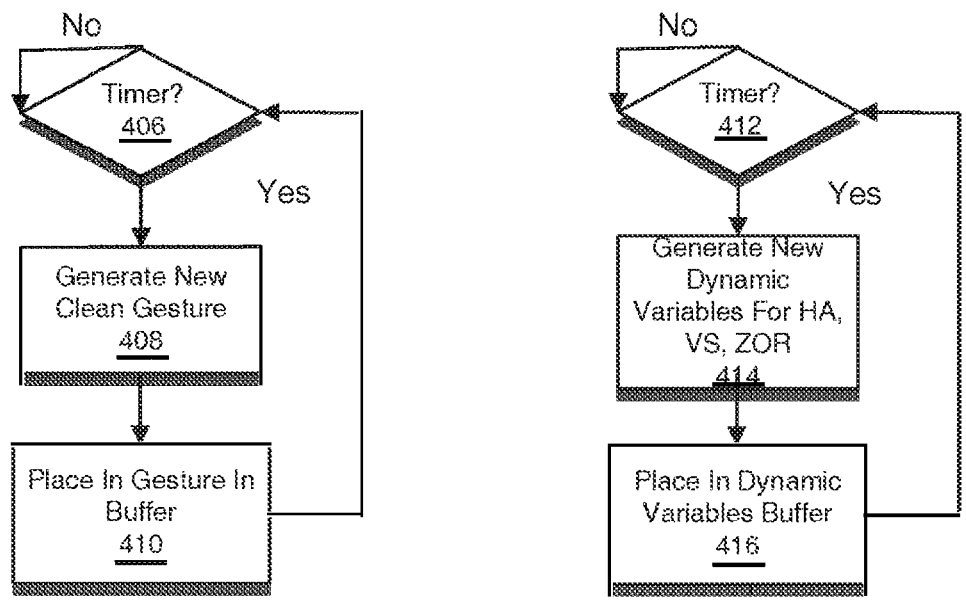
FIG. 4C shows a flowchart for exemplary operation of a gesture engine and exemplary operation of a physics engine.

FIG. 4C shows a flowchart for exemplary operation of a gesture engine and exemplary operation of a physics engine. In particular 406-410 relate to gesture engine 104 and 412-416 relate to physics engine 106. With respect to gesture engine 104, in 406, it is determined whether a time has expired. If not ('No' branch of 406), flow continue with 406. If so ('Yes' branch of 406), flow continues with 408 and new clean gesture data 132 is generated. In 410, clean gesture data 132 is placed in a buffer and flow continues with 406.

With respect to physics engine 106, in 412, it is determined whether a time has expired. If not ('No' branch of 412), flow continue with 414. If so ('Yes' branch of 412), flow continues with 414 and new dynamic variables 148 is generated, which may include dynamic variables for HA 18, virtual surface 112 and zone of restriction 110. In 416, dynamic variables are placed in a buffer where they are made available for action interpretation module 144.

Figure 4D:
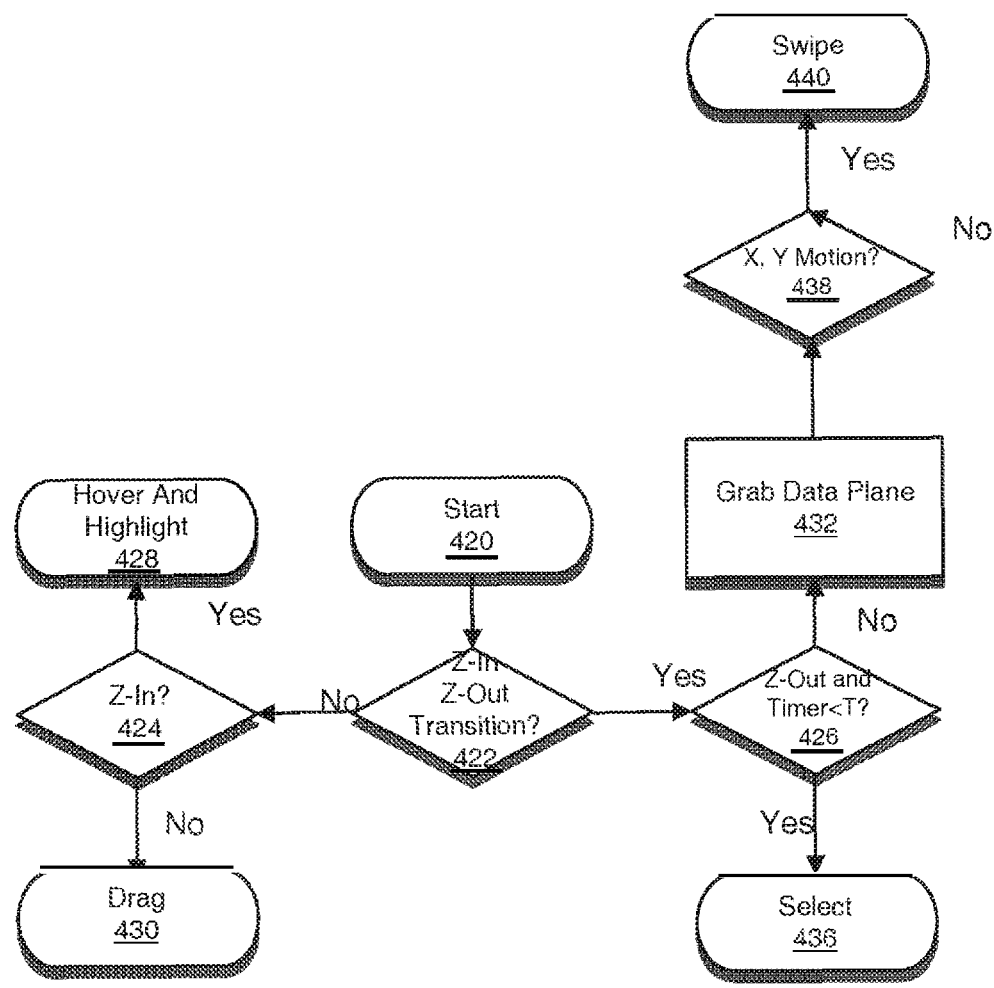
FIG. 4D is a flowchart depicting an exemplary operation of an action interpretation module.

FIG. 4D is a flowchart depicting an exemplary operation of an action interpretation module. Action interpretation module 144 may receive dynamic variables 148 from physics engine 106 in order to generate an action object 146. The process is initiated in 420. In 422 it is determined whether a transition between Z-In 734 and Z-Out states has occurred. If no transition is detected, in 424 it is determined whether the current state is Z-In 434. If not ('No' branch of 424) in 430 the interpreted action is a drag action 722. Otherwise ('Yes' branch of 424) in 428 the interpreted action is a hover and highlight action 720.

If a Z-In/Z-Out transition is detected in 422 ('Yes' branch of 422), flow continues with 426. In 426 it is determined whether a timer has run before a Z-Out transition (i.e., is less than a threshold T). If so ('No' branch of 426), flow continues with 432 and it is understood that user 116 has grabbed data plane 120. In 438 it is determined whether user 116 has provide X/Y motion in the lateral plane. If not ('No' branch of 438), flow continues with 438. If so ('Yes' branch of 438), flow continues with 440 and the interpreted action is swipe 204 in 440.

If, on the other hand, the timer is less than the threshold T and a Z-Out transition has occurred in 426, flow continues with 436 and select action 202 is interpreted as occurring.

The system, methods and components of the navigation techniques described herein may be embodied in a multimedia console, such as a gaming console, or in any other computing device in which it is desired to recognize gestures of a user for purposes of user input, including, by way of example and without any intended limitation, satellite receivers, set top boxes, arcade games, personal computers (PCs), portable telephones, personal digital assistants (PDAs), and other hand-held devices.

Figure 5:
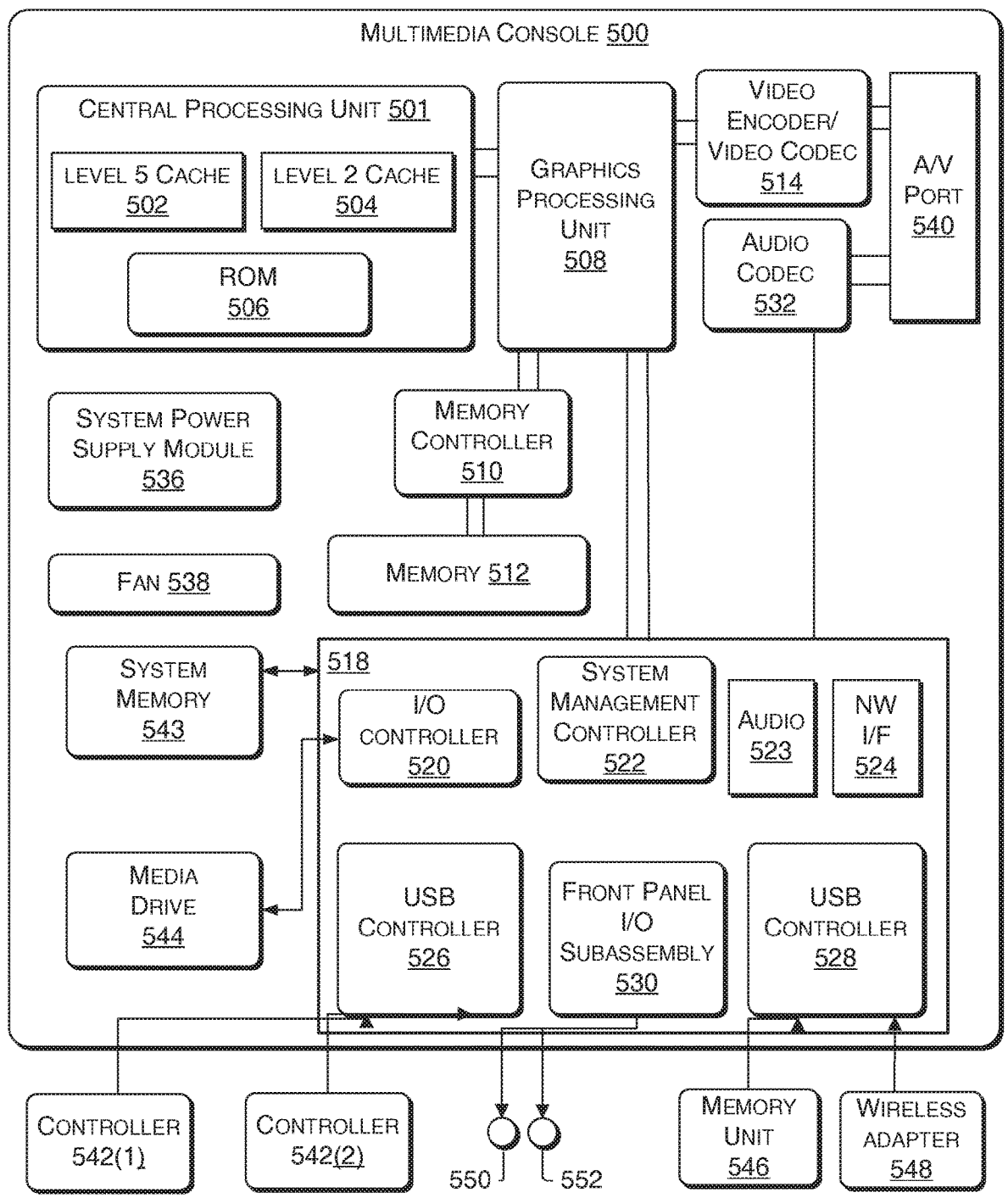
FIG. 5 illustrates an exemplary multi-media gaming computing environment in which in which the navigation techniques described herein may be embodied.

FIG. 5 is a block diagram of one example of a multimedia console 500, such as a gaming console, in which the navigation techniques described herein may be embodied. The multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. The CPU 501 may be provided having more than one core, and thus, additional level 1 and level 2 caches 502 and 504. The flash ROM 506 may store executable code that is loaded during an initial phase of a boot process when the multimedia console 500 is powered ON.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface controller 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 148, and an external memory device 546 (e.g., flash memory, external CD/DVD ROM drive, removable media, etc.). The network interface 124 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, hard drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio player or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered ON, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community.

When the multimedia console 500 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Figure 6:
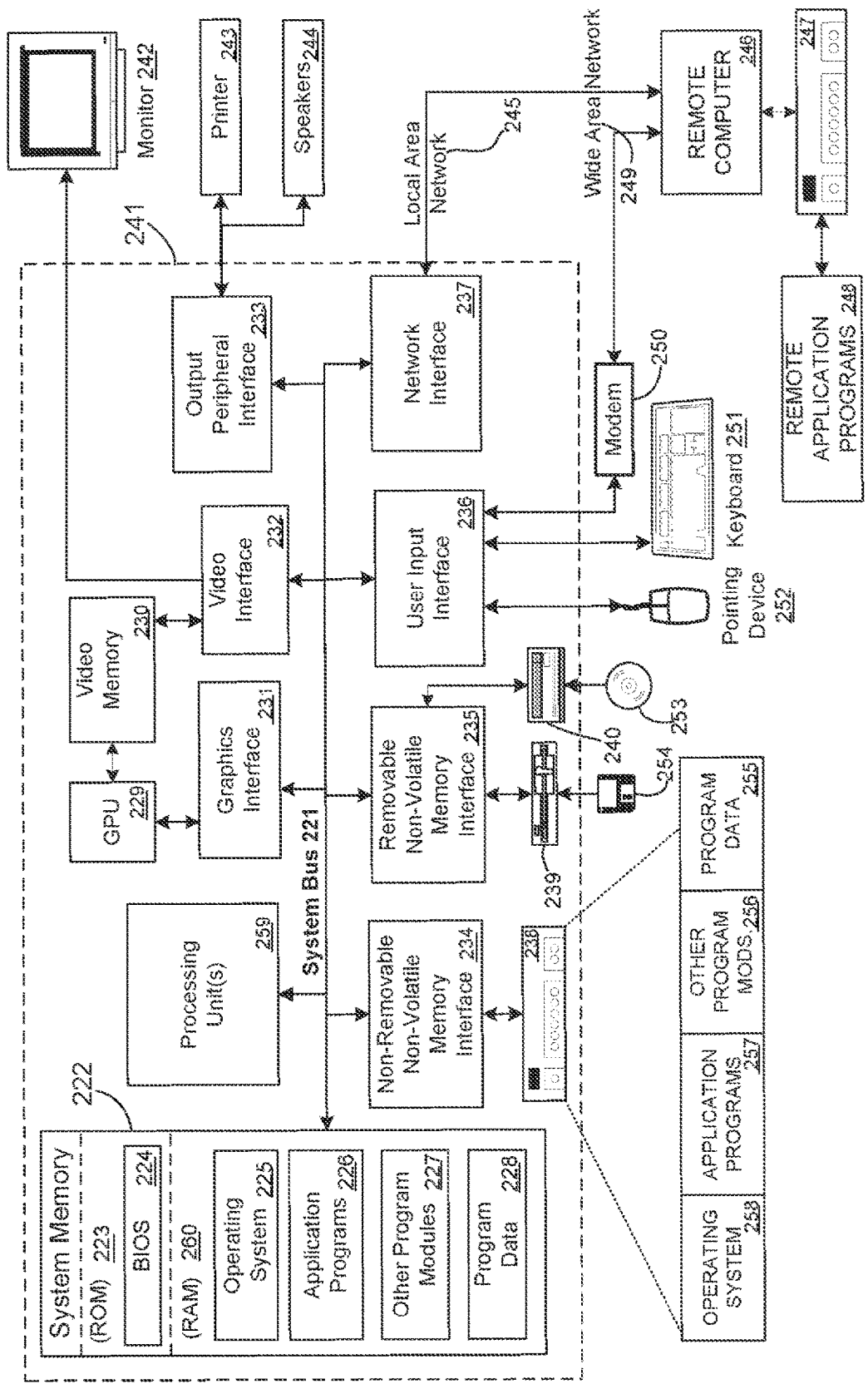
FIG. 6 illustrates an exemplary general purpose computing environment in which in which the navigation techniques described herein may be embodied.

As another example, FIG. 6 is a block diagram of a general purpose computing device in which the navigation techniques described herein may be employed. Numerous embodiments of the present disclosure may execute on a computer. For example, the computer executable instructions that carry out the processes and methods for providing PC experiences on gaming consoles may reside and/or be executed in such a computing environment as shown in FIG. 5. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 241 typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 6 illustrates operating system 225, application programs 226, other program modules 227, and program data 228.

The computer 241 may also include other removable/non-removable, volatile/nonvolatile computer storage media. By way of example only, FIG. 6 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 6, provide storage of computer readable instructions, data structures, program modules and other data for the computer 241. In FIG. 6, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 6. The logical connections depicted in FIG. 6 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 6 illustrates remote application programs 248 as residing on memory device 247. It will be appreciated that the network connections shown are exemplary and other means of establishing a communications link between the computers may be used.

What is claimed:

1. A method for controlling a computing device, the method comprising:
    defining a zone of restriction as an area or perimeter in X and Y dimensions that is a function of a Z coordinate in a Z dimension extending from a user through a virtual space defined in a three-dimensional space;
    receiving data regarding movement of an appendage in the three-dimensional space, the data received from an appendage detection device having a field-of-detection (FOD) that is larger than the zone of restriction relative to the X and Y dimensions for values of the Z coordinate between the user and a virtual surface;
    processing the received data to generate processed gesture data;
    determining at least one physical attribute of the processed gesture data, the at least one physical attribute including three-dimensional coordinates of the appendage in the X, Y, and Z dimensions; and
    analyzing the at least one physical attribute of the processed gesture data to determine an interpreted action responsive to the three-dimensional coordinates of the appendage being within the zone of restriction.

2. The method according to claim 1, wherein the virtual surface is a plane, and wherein the interpreted action is further determined based upon a spatial relationship of the processed gesture data with respect to the virtual surface and the zone of restriction.

3. The method according to claim 2, wherein the at least one physical attribute of the processed gesture data is movement of the appendage from in back of the virtual surface to in front of the virtual surface and then in back of the virtual surface, wherein the movement occurs within a predetermined time period and the interpreted action is a select.

4. The method according to claim 1, wherein the Z dimension extends in a forward direction from the user.

5. The method according to claim 1, wherein the zone of restriction defines a sensitivity to movements of the appendage.

6. The method according to claim 5, wherein the sensitivity is reduced as the appendage is moved forward relative to an origin that is a function of location of the user.

7. The method according to claim 1, wherein the zone of restriction has a conical shape that widens as its distance from the user increases.

8. The method according to claim 1, further comprising displaying a cursor as a function of the at least one physical attribute of the processed gesture data.

9. The method according to claim 8, wherein a shape of the cursor is dynamically modified as a function of a distance of the human appendage from the virtual surface.

10. The method according to claim 1, wherein the appendage detection device is a camera, and the data regarding the appendage movement is determined based on image data from the camera.

11. The method according to claim 1, wherein the virtual surface is curved in a manner to compensate for ergonomics of a human body, and wherein the interpreted action is further determined based upon a spatial relationship of the processed gesture data with respect to the virtual surface and the zone of restriction.

12. A computer readable storage device storing instructions for human computer interaction, wherein the computer readable storage device is not a transitory signal, the instructions comprising:
    defining a zone of restriction as an area or perimeter in X and Y dimensions that increases in size as a function of a Z coordinate in a Z dimension extending from a user through a virtual space defined in a three-dimensional space;
    receiving data regarding movement of an appendage in the three-dimensional space, the data received from an appendage detection device having a field-of-detection (FOD) that is larger than the zone of restriction relative to the X and Y dimensions for values of the Z coordinate between the user and a virtual surface;
    processing the data to generate processed gesture data;
    determining at least one physical attribute of the processed gesture data; and
    analyzing the at least one physical attribute of the processed gesture data to determine an interpreted action based at least upon a spatial relationship of the processed gesture data with respect to the zone of restriction, the spatial relationship defining a sensitivity with which movements of the appendage are interpreted, the sensitivity being non-zero within at least a portion of the zone of restriction.

13. The computer readable storage device according to claim 12, wherein the virtual surface is a plane, and wherein the interpreted action is further determined based upon a spatial relationship of the processed gesture data with respect to the virtual surface.

14. The computer readable storage device according to claim 13, wherein the at least one physical attribute of the processed gesture data is movement of the appendage from in back of the virtual surface to in front of the virtual surface and then in back of the virtual surface, wherein the movement occurs within a predetermined time period and the interpreted action is a select.

15. The computer readable storage device according to claim 12, wherein the Z dimension extends in a forward direction from the user.

16. The computer readable storage device according to claim 12, wherein the sensitivity is reduced as the appendage is moved forward relative to an origin that is a function of location of the user.

17. The computer readable storage device according to claim 12, wherein the zone of restriction has a conical shape that widens as its distance from the user increases.

18. A system for analyzing human computer interaction comprising:
    a processor; and
    a memory storing thereon computer-executable instructions that, when executed by the processor, configure the system to:
        process input data to generate gesture data, the input data received from an appendage detection device; and
        determine an interpreted action based upon a spatial relationship of the gesture data with respect to a zone of restriction, wherein the zone of restriction is an area or perimeter in X and Y dimensions that is a function of a Z coordinate in a Z dimension that extends from a user through a virtual space defined in a three-dimensional space, the zone of restriction being smaller than an area-of-detection of the appendage detection device relative to the X and Y dimensions for values of the Z coordinate between the user and a virtual surface, and wherein the spatial relationship defines a sensitivity with which the gesture data is tracked, the sensitivity being non-zero within at least a portion of the zone of restriction.

19. The system according to claim 18, wherein the appendage detection device is a camera configured to generate the input data as a function of a state of a three-dimensional environment.

* * * * *